US 8,624,532 B2

(12) United States Patent
Chuah et al.

(10) Patent No.: US 8,624,532 B2
(45) Date of Patent: Jan. 7, 2014

(54) SYSTEM AND METHOD FOR SYNCHRONIZING SINUSOIDAL DRIVE TO PERMANENT MAGNET MOTOR WITHOUT DISTORTING DRIVE VOLTAGE

(75) Inventors: Yew Tat Chuah, Singapore (SG); Yisong Lu, Singapore (SG)

(73) Assignee: Texas Instruments Incorporated, Dallas, TX (US)

( * ) Notice: Subject to any disclaimer, the term of this patent is extended or adjusted under 35 U.S.C. 154(b) by 223 days.

(21) Appl. No.: 13/199,126

(22) Filed: Aug. 19, 2011

(65) Prior Publication Data
US 2013/0043814 A1 Feb. 21, 2013

(51) Int. Cl.
*H02P 6/18* (2006.01)
(52) U.S. Cl.
USPC .. 318/400.04; 318/607; 318/606; 318/400.01; 318/700
(58) Field of Classification Search
USPC ............. 318/400.04, 400.01, 700, 400.14, 318/400.06, 400.24, 400.25, 400.27, 606, 318/607
See application file for complete search history.

(56) References Cited

U.S. PATENT DOCUMENTS

| | | | | |
|---|---|---|---|---|
| 4,399,395 | A * | 8/1983 | Espelage | 318/803 |
| 4,446,512 | A * | 5/1984 | Jarvinen | 363/39 |
| 4,916,370 | A * | 4/1990 | Rowan et al. | 318/368 |
| 5,672,948 | A * | 9/1997 | Cohen et al. | 318/603 |
| 5,838,128 | A * | 11/1998 | Maiocchi et al. | 318/400.35 |
| 6,252,362 | B1 * | 6/2001 | White et al. | 318/400.35 |
| 6,385,066 | B1 * | 5/2002 | Garces et al. | 363/87 |
| 6,498,451 | B1 * | 12/2002 | Boules et al. | 318/661 |
| 6,586,898 | B2 * | 7/2003 | King et al. | 318/400.34 |
| 6,633,145 | B2 * | 10/2003 | Shao et al. | 318/400.35 |
| 6,771,033 | B2 * | 8/2004 | Kokami et al. | 318/400.35 |
| 7,106,021 | B2 * | 9/2006 | DeCusatis et al. | 318/606 |
| 7,230,785 | B2 * | 6/2007 | Itagaki et al. | 360/73.03 |
| 7,429,841 | B2 * | 9/2008 | Yunus et al. | 318/400.01 |
| 7,477,034 | B2 * | 1/2009 | MacKay | 318/432 |
| 8,217,615 | B2 * | 7/2012 | Tan et al. | 318/650 |
| 8,278,867 | B2 * | 10/2012 | Habbley et al. | 318/727 |

OTHER PUBLICATIONS

"Position sensorless brushless DC motor/generator drives: review and future trends", T. Kim, H-W. Lee and M. Ehsani, IET Electr. Power Appl., vol. 1, No. 4, Jul. 2007, pp. 557-564.
"Sensorless PM Brushless DC Motor Drives", Nobuyuki Matsui, IEEE Transactions on Industrial Electronics, vol. 43, No. 2, Apr. 1996, pp. 300-308.
Implementation of a Speed Field Oriented Control of 3-phase PMSM Motor using TMS320F240, Erwan Simon, Texas Instruments Application Report SPRA588, Sep. 1999, pp. 1-10 of 86.
"Clarke & Park Transforms on the TMS320C2xx", Texas Instruments Application Report BPRA048, 1997, pp. 1-46.

* cited by examiner

*Primary Examiner* — Rita Leykin
(74) *Attorney, Agent, or Firm* — Alan A. R. Cooper; W. James Brady, III; Frederick J. Telecky, Jr.

(57) ABSTRACT

A system for controlling a motor (3) includes a driver circuit (5) for generating a drive voltage (v) to generate a phase current (i) in the motor. Phase current sensing circuitry (10, 21) digitizes the phase current. A first circuit (23) provides a reconstructed digital representation of a BEMF signal ($v_{bemf}$) of the motor to generate an error-corrected synchronization signal (SYNC) in response to the phase current and a detected error in the motor speed, an amplitude feedback signal (15), and information ($i_R, i_L, \Delta i_L, v_L$) indicative of a resistance ($R_m$) and an inductance ($L_m$) of the motor. A motor drive signal (15) having an error-corrected frequency is generated in response to the synchronization signal. A PWM circuit (16) produces a PWM signal (17) having a frequency equal to the error-corrected frequency of the synchronization signal (SYNC) and a duty cycle controlled according to the detected error.

20 Claims, 6 Drawing Sheets

SYSTEM AND METHOD FOR SYNCHRONIZING SINUSOIDAL DRIVE TO PERMANENT MAGNET MOTOR WITHOUT DISTORTING DRIVE VOLTAGE

BACKGROUND OF THE INVENTION

The present invention relates generally to reducing the acoustic noise caused by torque ripple in permanent magnet motors, and more particularly to reducing the acoustic noise without "tri-stating" the sinusoidal motor drive voltage that causes the torque ripple.

Permanent magnet motors generate a sinusoidal back electro-motive force (BEMF), and therefore require a sinusoidal drive signal to ensure low torque ripple so the acoustic noise generated by the motor will be low. The motor drive signal ordinarily is "tri-stated" for a time interval to synchronize the BEMF and a drive signal "profile" applied to drive the motor. This is necessary in order to measure the BEMF of the motor. The tri-stating of the motor drive voltages causes them to abruptly go to zero during the tri-stating interval, and this in turn causes the phase current to also go to zero during the tri-stating interval. The outputs of push-pull driver circuits (not shown) included in a motor driver circuit 5 (see subsequently described FIG. 2) are tri-stated, by turning off both the pull-up transistors and pull-down transistors thereof so that the drive voltage conductors are no longer being driven by the motor driver circuit. Since the output of each push-pull driver is tri-stated, it conducts a voltage that represents the motor BEMF. The segment A in subsequently described FIG. 1 indicates that the output of the push-pull driver is tri-stated, but the voltage generated by the motor on an output conductor of a push-pull driver actually is the motor BEMF.

The abrupt transition of the phase current to zero at the beginning of the tri-stating interval causes distortion in the motor phase current. (The term "tri-stating" of the motor drive voltage means that the pull-up transistors and pull-down transistors of the output stages of the motor driver circuitry are simultaneously turned off during the tri-stating interval, causing the voltages on the motor drive conductors to be determined only by the motor during the tri-stating interval.)

The motor torque is equal to the product of the phase current and the BEMF of the permanent magnet motor, so the above mentioned distortion in the phase current causes a substantial disturbance in the torque ripple, and therefore causes the motor to generate acoustic noise. The acoustic noise is dependent on the motor torque, and if the torque is constant, the acoustic noise is very low. However, if there is substantial ripple or variation in torque it results in a substantial amount of acoustic noise. (The acoustic noise is believed to be generated by small mechanical deformations caused by the torque ripple in material of which the motor is fabricated.)

Prior Art FIG. 1 shows waveforms for the sinusoidal drive voltage, the resulting phase current, and the sensed BEMF of a conventional permanent magnet motor. As indicated by segment "A" of the motor drive voltage waveform in FIG. 1, the drive voltage waveform is tri-stated for an interval during which a segment "B" of both the drive voltage waveform and the phase current waveform are zero. Therefore, the phase current is also considered to be tri-stated while phase current abruptly goes to zero and remains at zero during the tri-state interval B. After the tri-state interval B, the three waveforms in Prior Art FIG. 1 continue their normal sinusoidal variation for the negative portion of the sinusoidal cycle, wherein drive voltage, and hence the phase current, again are tri-stated as they approach the zero crossover level.

Prior Art FIG. 1 also shows the waveform of a sensed signal SYNC which represents the present motor speed. The BEMF voltage continues while a single drive voltage is being tri-stated by the motor driver circuit. The zero cross-over points of the BEMF voltage typically are sensed by means of an ordinary comparator in order to generate the BEMF zero crossover signal SYNC.

FIG. 1 also shows the torque characteristic of the motor. The normal torque level is indicated by "C". The levels "D" of the torque characteristic indicate the large torque distortion or ripple caused by the phase current going to zero during the tri-state intervals B.

Other relevant prior art includes commonly assigned U.S. Pat. No. 6,252,362 entitled "Method and Apparatus for Synchronizing PWM Sinusoidal Drive to a DC Motor" issued Jun. 26, 2001 to White et al., incorporated herein by reference. This reference discloses a technique for tri-stating and synchronizing drive voltage to a DC permanent magnet motor to reduce acoustic noise of the motor. When the drive waveforms are properly synchronized, they cause a current in the motor windings that is in phase with the BEMF of the motor.

Microcontrollers, such as digital signal processors (DSPs), are commonly used to control the driver circuits that generate the drive voltages applied to permanent magnet motors. Techniques for using digital signal processors for sinusoidal driving of permanent magnet DC motors are disclosed in the technical article "Position Sensorless Brushless DC Motor/Generator Drives: Review and Future Trends" by T. Kim et al., IET Electr. Power Appl., Vol. 1, No. 4, July, 2007. Also see "Sensorless PM Brushless DC Motor Drives" by Nobuyuki Matsui, IEEE Transactions on Industrial Electronics, Vol. 43, No. 2, April 1996. Also see Texas Instruments Application Report SPRA588 entitled "Implementation of a Speed Field Oriented Control of 3-Phase PMSM Using TMS320" by Erwan Simon.

Unfortunately, the techniques including use of microcontrollers, DSPs, or the like to generate the drive voltages applied to permanent magnet motors are very complex, and sometimes include use of the well known Clarke-Park Transformation and PID (proportional-integral-derivative) controllers, and therefore are relatively expensive. The Clarke-Park Transformation is described in the Texas Instruments Application Report, Literature Number BPRA048, entitled Clarke & Park Transforms on the TMS320C2xx (1997). The Wikipedia article "PID Controller" cited in the Information Disclosure Statement submitted with the present application describes PID controller techniques.

Thus, there is an unmet need for a circuit and method for driving a permanent magnet electric motor so as to eliminate acoustic noise without tri-stating its drive voltages.

There also is an unmet need for a circuit and method for eliminating acoustic noise produced by an electric motor without tri-stating a motor drive voltage.

There also is an unmet need for a circuit and method for driving a permanent magnet electric motor without tri-stating the motor drive voltage wherein parameters of the motor are automatically determined.

There also is an unmet need for a circuit and method for driving a permanent magnet electric motor without the complexity and cost of utilizing a complex microcontroller such as a DSP.

SUMMARY OF THE INVENTION

It is an object of the invention to provide a circuit and method for eliminating acoustic noise produced by a permanent magnet electric motor without tri-stating a motor drive voltage.

It is another object of the invention to provide circuit and method for driving an electric motor so as to eliminate acoustic noise without tri-stating its drive voltage.

It is another object of the invention to provide a circuit and method for driving a permanent magnet electric motor without tri-stating the motor drive voltage wherein information representative of parameters of the motor is automatically determined, or is provided in a non-volatile memory such as an EEPROM.

There also is an unmet need for a circuit and method for driving a permanent magnet electric motor without the complexity and cost of utilizing a complex microcontroller, such as a DSP.

Briefly described, and in accordance with one embodiment, the present invention provides a system for controlling a motor (3), including a driver circuit (5) for generating a drive voltage (v) to generate a phase current (i) in the motor. Phase current sensing circuitry (10,21) digitizes the phase current. A first circuit (23) provides a reconstructed digital representation of a BEMF signal ($v_{bemf}$) of the motor to generate an error-corrected synchronization signal (SYNC) in response to the phase current and a detected error in the motor speed, an amplitude feedback signal (15), and information ($i_R, i_L, \Delta i_L, v_L$) indicative of a resistance ($R_m$) and an inductance ($L_m$) of the motor. A motor drive signal (15) having an error-corrected frequency is generated in response to the synchronization signal. A PWM circuit (16) produces a PWM signal (17) having a frequency equal to the error-corrected frequency of the synchronization signal (SYNC) and a duty cycle controlled according to the detected error.

In one embodiment, the invention provides a system (1) for controlling a permanent magnet motor (3), including a driver circuit (5) for generating a drive voltage (v) applied to the motor (3), the motor (3) generating a phase current (i) in response to the drive voltage (v). Phase current sensing circuitry (10,21) senses the phase current (i) and converts it to a digitized phase current. A BEMF (back electromotive force) reconstruction circuit (23) provides a reconstructed digital representation of a BEMF signal ($v_{bemf}$) of the motor (3) to generate an error-corrected synchronization signal (SYNC) in response to the digitized phase current signal, an amplitude feedback signal (15), information ($i_R, i_L, \Delta i_L, v_L$) indicative of both a resistance ($R_m$) and an inductance ($L_m$) of the motor (3), and a detected error in the speed of the motor (3). Signal profile generating circuitry (12,14) generates a motor drive signal (15) having an error-corrected frequency that is determined by the synchronization signal (SYNC) and is in synchronization with the synchronization signal (SYNC). A PWM (pulse width modulation) circuit (16) receiving the motor drive signal (15) produces a PWM signal (17) having a frequency equal to the error-corrected frequency of the synchronization signal (SYNC) and has a duty cycle controlled in accordance with the detected error in the speed of the motor (3).

In one embodiment, a parameter calculation circuit (22) generates the information indicative of both the motor resistance ($R_m$) and the motor inductance ($L_m$) in response to the digitized phase current under predetermined conditions. The parameter calculation circuit (22) includes a state machine (19) which performs the functions of mechanically stopping rotation of a rotor of the motor (03), applying the drive voltage (v) as a high frequency sinusoidal signal until the phase current (i) is at a DC value, saving a first value ($v_R$) of the applied voltage (v), and saving a resulting value ($i_R$) of the digitized phase current, generating the information indicative of the motor resistance ($R_m$) from the first value ($v_R$) of the applied voltage (v) and the resulting value ($i_R$) of the digitized phase current signal, causing the phase current (i) to be equal to zero, saving a measured value of current change ($\Delta i_L$) and a second value ($v_L$) of the applied drive voltage (v), and generating the information indicative of the motor inductance ($L_m$) from the measured value of current change ($\Delta i_L$) and the second value ($v_L$) of the applied drive voltage (v). The motor resistance ($R_m$) may be represented by the expression $R_m = v_R/i_R$ and the motor inductance ($L_m$) may be represented by the expression $$L_m = \frac{v_L}{\Delta i_L / \Delta t},$$

where $v_R$ is the first value of the applied voltage (v), $i_R$ is the resulting value of the digitized phase current, $v_L$ is the second value of the applied drive voltage (v), $\Delta i_L$ is the measured value of current change, and $\Delta t$ is a time interval.

In one embodiment, the BEMF reconstruction circuit (23) includes a state machine (20) which operates to capture a digitized phase current (I), a change ($\Delta I$) in the digitized phase current (I), and a digitized motor driving voltage (V). The BEMF construction circuit (23) operates to compute a value of the BEMF signal ($v_{bemf}$) in accordance with the expression $$k \cdot v_{bemf} = V \cdot i_R \cdot \Delta i_L - I \cdot v_R - v_L \cdot \Delta I,$$

where V is the digitized motor driving voltage, I is the digitized phase current, $\Delta I$ is a change in the digitized phase current, $i_R$ is a current indicative of the resistance ($R_m$) of the motor, $v_R$ is a voltage indicative of the resistance ($R_m$), $\Delta i_L$ is a change of a current indicative of the inductance ($L_m$) of the motor, and $v_L$ is a voltage indicative of the inductance ($L_m$) of the motor.

In a described embodiment, the state machine (20) operates to cause the synchronization signal (SYNC) to be at a first logic level ("0") if a MSB (most significant bit) of the BEMF signal ($v_{bemf}$) is a "0" and to cause the synchronization signal (SYNC) to be at a second logic level ("1") if the MSB of the BEMF signal ($v_{bemf}$) is a "1". In a described embodiment, another state machine (19) generates the information ($i_R, i_L, \Delta i_L, v_L$) indicative of the resistance ($R_m$) and the inductance ($L_m$) of the motor (3) in response to the phase current.

In a described embodiment, the signal profile generating circuitry (12,14) includes an electrical period measuring circuit (12) for measuring an amount of time between corresponding edges of successive pulses of the synchronization signal (SYNC).

In one embodiment, the motor (3) is a three phase motor, and the phase current (i) is generated in response to a single drive voltage (v). In one embodiment, the signal profile generating circuit (12,14) generates the motor drive signal (15) as a sinusoidal signal. In another embodiment, the signal profile generating circuit (12,14) generates the motor drive signal (15) as a trapezoidal signal.

In one embodiment, the invention provides a method for controlling a permanent magnet motor (3), including generating a drive voltage (v) applied to the motor (3), the motor (3) generating a phase current (i) in response to the drive voltage (v); sensing the phase current (i) and converting it to a digitized phase current signal (I); providing information indicative of both a motor resistance ($R_m$) and a motor inductance ($L_m$); generating a reconstructed digital representation of a BEMF signal ($v_{bemf}$) produced in the motor (3) in response to an amplitude feedback signal (15), the digitized phase current signal (I), the information indicative of the motor resistance ($R_m$) and the motor inductance ($L_m$), and a detected difference between a speed of the motor (3) and a desired speed of the motor (3) in order to produce a synchronization signal (SYNC) having an error-corrected frequency that is determined by zero crossover points of the reconstructed digital representation of the BEMF signal ($v_{bemf}$); using a drive signal profile to generate a digital motor drive signal (15) having the error-corrected frequency; and producing a PWM signal (17) having a frequency equal to the error-corrected frequency and also having a duty cycle controlled according to the detected difference between the speed of the motor (3) and the desired speed of the motor (3).

In one embodiment, the method includes operating the BEMF reconstruction circuit (23) to compute a value of the BEMF signal ($v_{bemf}$) in accordance with the expression $$k \cdot v_{bemf} = V \cdot i_R \cdot \Delta i_L - I \cdot v_R - v_L \cdot \Delta I,$$

where V is the digitized motor driving voltage, I is the digitized phase current, $\Delta I$ is a change in the digitized phase current, $i_R$ is a current indicative of the resistance ($R_m$) of the motor, $v_R$ is a voltage indicative of the resistance ($R_m$), $\Delta i_L$ is a change of a current indicative of the inductance ($L_m$) of the motor, and $v_L$ is a voltage indicative of the inductance ($L_m$) of the motor. In one embodiment, the BEMF reconstruction circuit (23) includes a state machine (20) which operates to capture the digitized phase current (I), the change in the digitized phase current ($\Delta I$), and the digitized motor driving voltage (V), the method including operating the state machine (20) to cause the synchronization signal (SYNC) to be at a first logic level ("0") if a MSB (most significant bit) of the BEMF signal ($v_{bemf}$) is a "0" and to cause the synchronization signal (SYNC) to be at a second logic level ("1") if the MSB of the BEMF signal ($v_{bemf}$) is a "1".

In one embodiment, the method includes operating the state machine (20) to cause the synchronization signal (SYNC) to be at a first logic level ("0") if a MSB (most significant bit) of the BEMF signal ($v_{bemf}$) is a "0" and to cause the synchronization signal (SYNC) to be at a second logic level ("1") if the MSB of the BEMF signal ($v_{bemf}$) is a "1".

In one embodiment, the method includes operating the signal profile generating circuit (12,14) to generate the motor drive signal (15) as a sinusoidal signal.

In one embodiment, the invention provides a system (1) for controlling a permanent magnet motor (3), including means (5) for driving a drive voltage (v) applied to the motor (3), the motor (3) generating a phase current (i) in response to the drive voltage (v); means (10,21) for sensing the phase current (i) and converting it to a digitized phase current signal (I); means (22) for providing information indicative of both a motor resistance ($R_m$) and a motor inductance ($L_m$); means (23) for generating a reconstructed digital representation of a BEMF signal ($v_{bemf}$) produced in the motor (3) in response to an amplitude feedback signal (15), the digitized phase current signal (I), the information indicative of the motor resistance ($R_m$) and the motor inductance ($L_m$), and a detected difference between a speed of the motor (3) and a desired speed of the motor (3) in order to produce a synchronization signal (SYNC) having an error-corrected frequency that is determined by zero crossover points of the reconstructed digital representation of the BEMF signal ($v_{bemf}$); means (12,14) for using a drive signal profile to generate a digital motor drive signal (15) having the error-corrected frequency; and means (16) for producing a PWM signal (17) having a frequency equal to the error-corrected frequency and also having a duty cycle controlled according to the detected difference between the speed of the motor (3) and the desired speed of the motor (3).

DETAILED DESCRIPTION OF THE PREFERRED EMBODIMENTS

The present invention provides a way of eliminating the above-mentioned problem of acoustic noise caused by phase current distortion in permanent magnet motors driven by the closest prior art motor controllers. This is accomplished by a technique of "reconstructing" the BEMF signal used to synchronize the driving of a permanent magnet motor without tri-stating its drive voltage. Consequently, there is no associated distortion of the motor phase current, and therefore there is no corresponding distortion of the motor torque which causes the acoustic noise.

Figure 2:
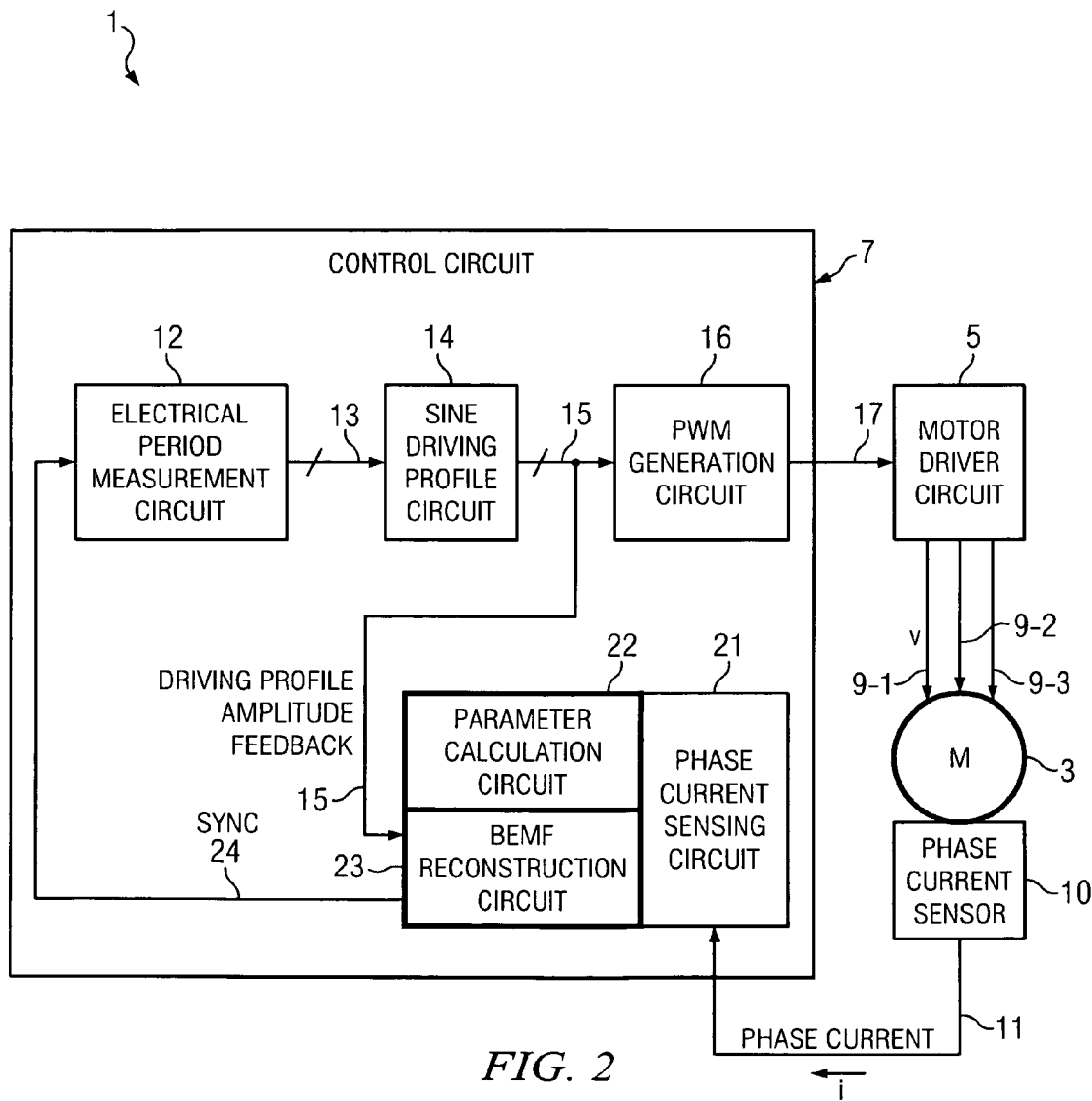
FIG. 2 is a block diagram of a circuit for driving a permanent magnet motor in accordance with the present invention.

Referring to FIG. 2, system 1 includes a permanent magnet motor 3 driven by a motor driver circuit 5. A motor controller circuit 7 receives a sensed phase current "i" of motor 3 through conductor 11 and produces a PWM (pulse width modulated) motor control signal on conductor 17 as an input to driver circuit 5. Sensed phase current i may be generated in conductor 11 by a conventional current sensor 10 that is either in or connected to motor 3. Control system 7 senses the phase current i and uses it to provide feedback from motor 3 to motor driver circuit 5. The feedback includes motor speed/frequency and phase information in the form of a synchronization signal SYNC on conductor 24 and amplitude information on bus 15.

Driver circuit 5 generates three-phase sinusoidal drive voltages on conductors 9-1, 9-2, and 9-3, respectively, in response to the above-mentioned feedback. (However, note that the invention is just as applicable to a single-phase permanent magnet motor as to a three-phase permanent magnet motor.) The driver circuits (not shown) in block 5 are conventional.

The circuitry in motor controller 7 that generates the above mentioned feedback includes a phase current sensing circuit 21 which receives the single phase current i generated in conductor 11 by phase current sensor 10 in response to current in motor 3. Motor controller 7 receives phase current i and provides PWM (pulse width modulation) feedback on conductor 17 to motor driver circuit 5. Motor controller 7 determines the amount of an error in the timing of SYNC, determined on the basis of the present phase current i and the present output 15 of sine driving profile circuit 14. Motor 3 is driven to its maximum speed, limited by the power supply. Since motor 3 does not have a terminal from which the phase current i can be directly conducted, current sensor 10, which can be either internal or external to motor 3, is used to determine the phase current i. Phase current sensing circuit 21 performs an analog-to-digital conversion of the analog phase current i to a digital representation which indicates values of i as a function of time. (Therefore, it can be seen that the phase current sensing according to the invention is very different than the phase current sensing in prior art permanent magnet motor controllers with waveforms such as those shown in Prior Art FIG. 1.)

The digital information generated by phase current sensing circuit 21 is received and utilized by a parameter calculation circuit 22 and a BEMF reconstruction circuit 23 to perform the function of "reconstructing" the BEMF signal, for example by means of suitable state machines. In block 22 of FIG. 2, information representative of the motor resistance $R_m$ and motor inductance $L_m$ is determined, for example, by means of a state machine such as the one shown in subsequently described FIG. 3A. The foregoing information representative of $R_m$ and $L_m$ of motor 3 is computed automatically, as indicated in blocks 30-40 of the flowchart of subsequently described FIG. 4. (Alternatively, the information representative of $R_m$ and $L_m$ may be previously determined and stored in block 22 in place of a parameter calculation circuit.)

Then, using (in effect) the foregoing values of $R_m$ and $L_m$ along with feedback generated on bus 15 by sine driving profile circuit 14, BEMF reconstruction circuit 23 in FIG. 2 digitally reconstructs the BEMF signal, determines its zero-crossing times, and generates rising edges of the synchronization signal SYNC on conductor 24 in response to the zero-crossing times. The frequency of SYNC therefore represents the instantaneous actual frequency (rotor speed) of motor 3. Any error in the motor speed may be determined by comparing it with the previously measured value representing the desired motor speed.

The BEMF zero-crossing signal SYNC on conductor 24 is applied to an input of an electrical period measurement circuit 12, the output 13 of which is connected to the input of a sine drive profile circuit 14. The frequency information contained in SYNC is converted to an electrical period measurement by circuit 12, and is presented on digital bus 13 as an input to sine driving profile circuit 14. The digital information on multi-conductor digital bus 13 represents error in the motor speed, which is corrected in response to the feedback provided by SYNC, because SYNC represents the variation in the frequency of motor 3. Sine driving profile circuit 14 stores a normalized sine wave and is able to interpret the electrical period measurement from circuit 12 so that sine driving profile circuit 14 produces a sine wave profile having the correct frequency.

Sine driving profile circuit 14 generates digital data that represents a sine wave on multi-conductor digital bus 15. The frequency of the digital sine wave data on digital bus 15 is adjusted in response to shifts in the frequency of SYNC. The measured present speed is in effect compared to the previously measured desired speed. If the motor is either accelerating or decelerating, there will be error between the previously measured desired speed and the currently measured speed, and feedback causes automatic correction of the error. The shifts in the frequency of SYNC are caused by changes in the values of phase current i and are also caused by an error or difference between a previous value of the sine driving profile information on bus 15 and a previously measured value representing the desired speed of motor 3. The period of SYNC is adjusted to minimize this error or difference in order to accomplish the correction. The sinusoidal driving profile amplitude control information on bus 15 in effect provides feedback that causes electrical period measurement circuit 12 to adjust the "ideal" sinusoidal profile information stored in sine driving profile circuit 14 to cause it to generate a corrected output on multi-conductor digital bus 15 of sine driving profile circuit 14.

In block 23 of FIG. 2, the BEMF signal of motor 3 is reconstructed within controller 7 in accordance with subsequently described Equations 1-6, which provide the basis for generating the data required to reconstruct the digital BEMF data signal that represents the "actual" analog BEMF signal of motor 3. The times at which the reconstructed BEMF signal crosses the zero volt level can be readily detected from the reconstructed BEMF data. The detected BEMF zero-crossing times then are utilized to adjust the timing between the SYNC pulses generated on conductor 24, which are coupled to an input of electrical period measurement circuitry 12 in FIG. 2. The waveform of SYNC is shown in subsequently described FIG. 5.

Electrical period measurement circuitry 12 then utilizes a counter (not shown) to measure the amount of time between corresponding edges of the pulses of synchronization signal SYNC, i.e., to measure the period of SYNC. Electrical period measurement circuit 12 then generates a feedback signal on digital bus 13 which represents the present speed of motor 3.

The signal on bus 13 represents the corrected speed of motor 3 and is synchronized with SYNC and the rotation of motor 3, and is utilized by sine driving profile circuit 14 to adjust the instantaneous amplitudes of the stored ideal sinusoidal driving profile information so as to generate the sinusoidal digital motor drive voltage profile on digital bus 15 as needed to maintain the desired motor speed.

The information on bus 15 includes digital sinusoidal signal information including both waveform amplitude information and synchronization information generated in response to the signal SYNC produced by BEMF reconstruction circuit 23 to control the frequency, phase, and amplitude of each of the three motor driver voltages. Motor 3 is driven by a pure sine wave signal because the digital amplitude information generated by sine driving profile circuit 14 represents a pure analog sine wave signal that rises from zero to a maximum positive voltage and then falls back through zero to a minimum negative voltage before returning to zero.

The digital signal on bus 15 is utilized by a conventional PWM generation circuit 16 to determine the duty cycle of a PWM signal 17 generated by PWM generation circuit 16. PWM circuit 16 generates pulses the widths of which have duty cycles as needed to adjust the amplitudes of the motor drive voltage signals. PWM generation circuit 16 may use a standard method of converting a signal amplitude to a duty cycle, including comparing the amplitude value with a triangular waveform. When the value of the digital signal on bus 15 is less than the value of the triangular waveform, the PWM signal generated on conductor 17 is low, and when the value of the triangular waveform is higher than the value of the digital signal on bus 15, the PWM signal generated on conductor 17 is high. The frequency of the provided triangular waveform is fixed. Therefore, as the amplitude of the digital signal on bus 15 increases, the duty cycle of the PWM signal generated on conductor 17 increases, and vice versa.

PWM signal 17 is utilized in motor driver circuit 5 to control the turning on and turning off of pull-up output transistors and pull-down transistors in the output stages of the three push-pull driver circuits (not shown) included in motor driver circuit 5. The pull-up and pull-down output transistors in motor driver circuit 5 are turned on and off in accordance with the duty cycle of PWM signal 17 and thereby control the amplitude, frequency, and phase of each of the three sinusoidal motor drive voltages on conductors 9-1, 9-2, and 9-3, respectively.

Figure 3A:
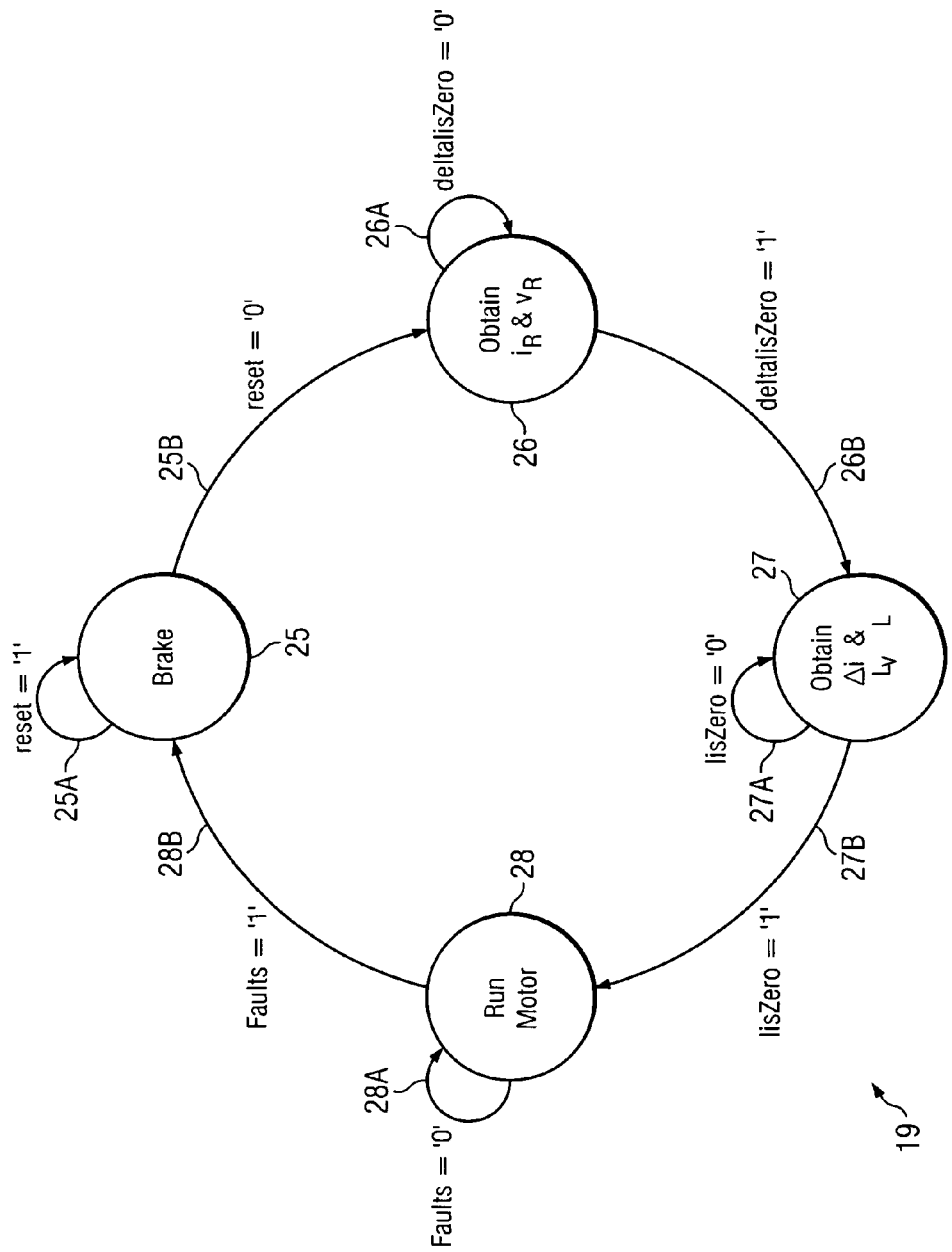
FIG. 3A is diagram of a state machine included in block 22 of FIG. 2.
Figure 3B:
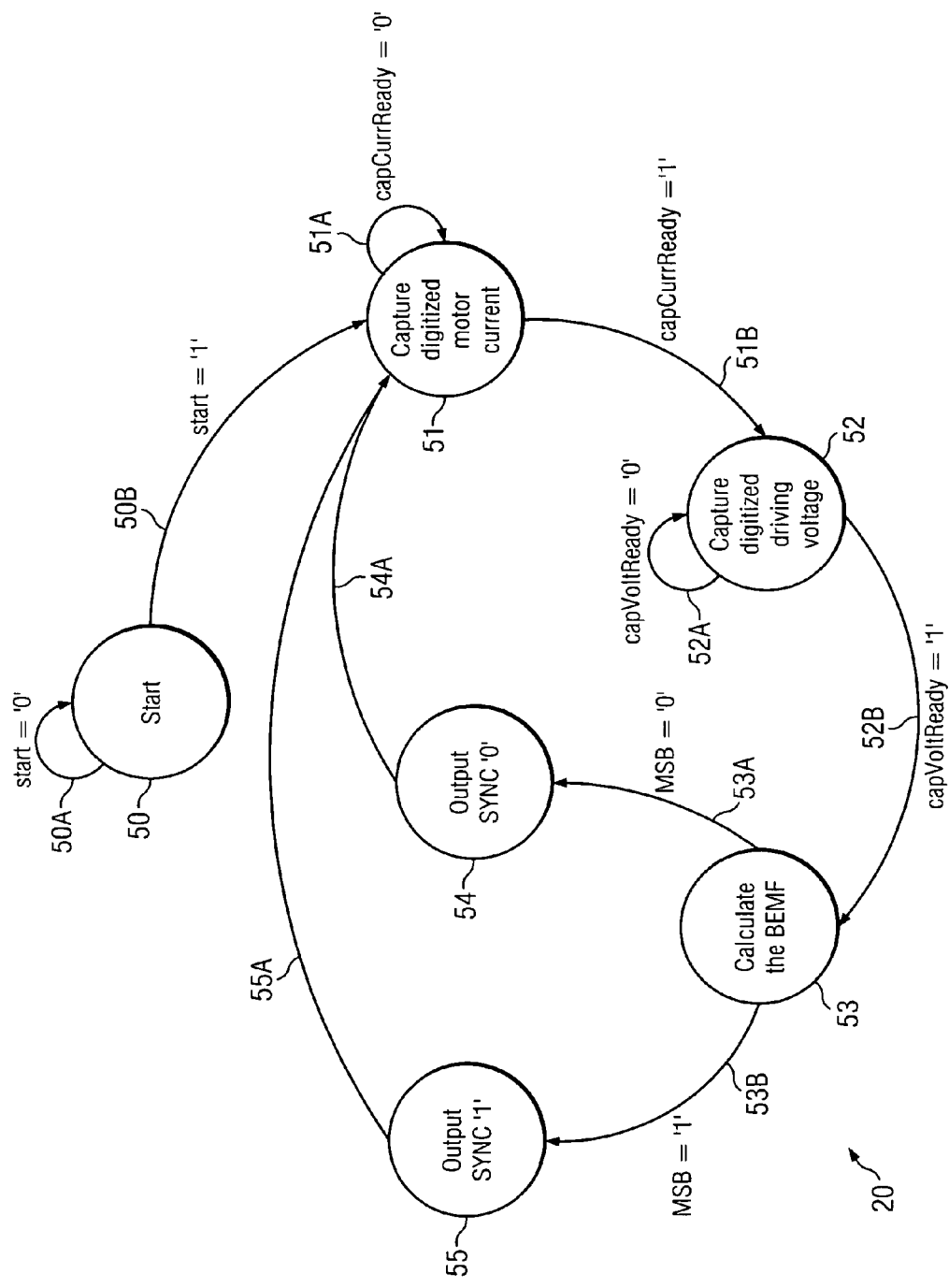
FIG. 3B is diagram of a state machine included in block 23 of FIG. 2.
Figure 5:
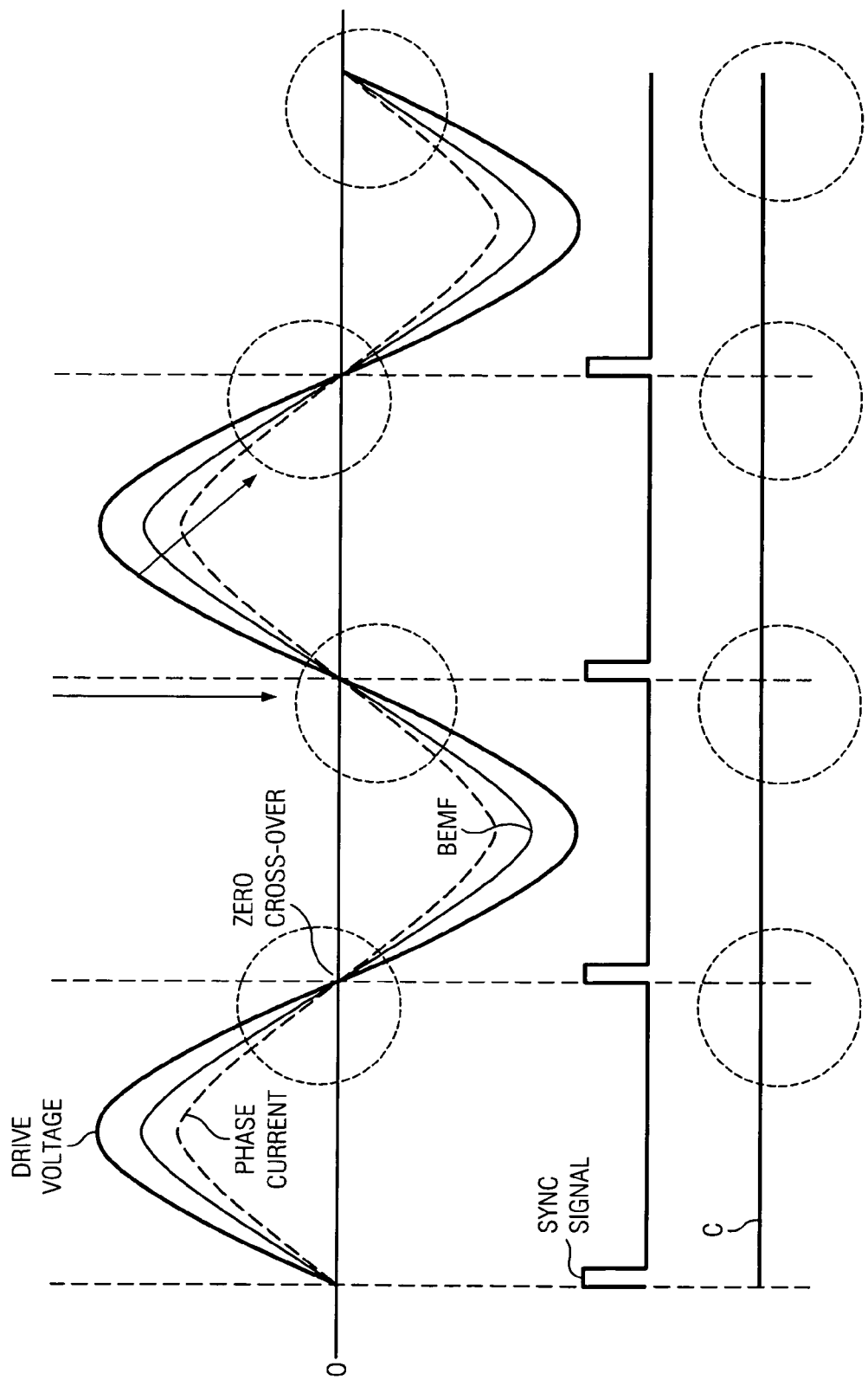
FIG. 5 is a timing diagram useful in describing the operation of the circuit of FIG. 2.

Before describing FIGS. 3A, 3B, and 5, it may be helpful to present the analytical basis for the motor parameter calculations performed by parameter calculation circuit 32 and the BEMF reconstruction calculations performed by BEMF reconstruction circuit 23.

The motor speed (i.e., angular velocity of the rotor of motor 3) is used to achieve the driving of motor 3 in synchronization with its BEMF. The phase current i of motor 3 does not directly provide the motor speed. However, information representative of the values of $L_m$ and $R_m$ may be derived from the digitized representation of phase current i. The digitized phase current i is used to reconstruct the BEMF of motor 3. The reconstructed BEMF signal then represents the actual BEMF signal generated by motor 3 on one of the tri-stated drive voltage conductors 9-1,2,3, and hence represents the speed of motor 3. The reconstructed BEMF signal also synchronizes the motor drive voltages generated by motor driver 5 with the BEMF of motor 3.

Theoretically, the speed of motor 3 may be derived from the measured phase current data by means of the following "motor equation":

$$\overline{v}_{bemf} = \overline{v} - \overline{i}R_m - L_m\frac{d\overline{i}}{dt}, \quad \text{(Eqn. 1)}$$

in which $\overline{v}_{bemf}$ is the BEMF of the driven motor 3 and is proportional to its speed. $\overline{v}$ is a phase output voltage vector of the driven motor 3, and $\overline{i}$ is the measured phase current vector of the driven motor. $R_m$ is the stator resistance of the driven motor, and $L_m$ is the inductance of the stator winding of the driven motor 3.

Equation 1 depends on not only the driven value $\overline{v}$ and the measured value $\overline{i}$, but also on the constant motor parameters $R_m$ and $L_m$ of motor 3. (Note that since these motor parameters vary from motor to motor, their values may be determined for each motor.)

For the case in which the phase current is sampled at a fixed frequency or motor speed, Equation 1 may be written as $$v_{bemf} = v - iR_m - L_m\frac{\Delta i}{\Delta t}. \quad \text{(Eqn. 2)}$$

In the case wherein motor 3 is stationary (see block 30 of subsequently described FIG. 4), $v_{bemf}$ is equal to zero, so Equation 2 is reduced to $$v_{bemf}=0=v_R-i_R\times R_m, \quad \text{(Eqn. 3)}$$

where $v_R$ and $i_R$ are the values of v and i utilized to compute $R_m$. Consequently, $R=v_R/i_R$.

The motor inductance $L_m$ is obtained from the measured current change $\Delta i_L$ and the value of the corresponding driven voltage $v_L$ while i=0, where $v_L$ and $i_L$ are the values of v and i utilized to compute $L_m$. In this case Equation 2 is reduced to $$0 = v_L - L_m\frac{\Delta i_L}{\Delta t}. \quad \text{(Eqn. 4)}$$

Consequently, $L_m = \frac{v_L}{\Delta i_L/\Delta t}$, where $\Delta i_L$ is the difference in the measured phase current during a suitable time internal $\Delta t$. Then, as indicated in block 40, the measured current change $\Delta i_L$ and the applied voltage $v_L$ are saved. $\Delta t$ is the PWM period, and is constant during the parameter calculation and driving of motor 3. And as indicated by Equation 5 below, $\Delta t$ is cancelled out.

Blocks 41-47 of subsequently described FIG. 4 indicate how the information indicative of the values of $R_m$ and $L_m$ is used by the state machine shown in subsequently described FIG. 3B in order to obtain the above-mentioned reconstructed BEMF data.

To accomplish this, Equations (3) and (4) are substituted into Equation (2), which results in $$v_{bemf} = v - i\frac{v_R}{i_R} - \frac{v_L}{\Delta i_L/\Delta t}\times\frac{\Delta i}{\Delta t}. \quad \text{Eqn. 5}$$

Multiplying Equation 5 by $i_R$ results in $$k\cdot v_{bemf}=v\cdot i_R\cdot\Delta i_L-i\cdot v_R-v_L\cdot\Delta i, \quad \text{Eqn. 6}$$

where $k\times v_{bemf}$ is the motor speed, k is equal to $i_R\times\Delta i_L$. (The value of k is not important since it is just a gain value, whereas the information of interest is the period information of $v_{bemf}$.)

From Equation 6, the motor speed $k\times v_{bemf}$ can be determined without the complex calculations which are required by the closest prior art motor control systems, and without having to tri-state the driver output which are also required by the closest prior art motor control systems.

In Equation 6, the instantaneous amplitude of motor drive voltage v is adjusted as needed to provide the required amount of drive to motor 3 to maintain its desired speed despite any variations in the load driven by motor 3 and despite any variations in certain other parameters. Digital values corresponding to the analog motor drive voltage v on conductors 9-1,2,3 are generated on bus 15 and are in accordance with Equation 6.

FIG. 3A shows a diagram of a state machine which can be included in block 22 of FIG. 2 to obtain the values of v, i, $\Delta i$, and $\Delta t$ needed to determine the values of the constant motor parameters $R_m$ and $L_m$. Referring to FIG. 3A, a state machine 19 for obtaining the information required to determine $R_m$ and $L_m$ includes states 25, 26, 27 and 28. State 25 is an initial "brake" or "standby" state that occurs when a condition "reset" is met, i.e., when "reset" goes from a "1" to a "0". State machine 19 then goes from state 25 to state 26. In state 26, when a condition "deltaIisZero" is met, i.e., goes from a "0" to a "1", state machine 19 causes the values $v_R$ and $i_R$ to be obtained, and then state machine 19 goes from state 26 to state 27. In state 27, when a condition "IisZero" goes from a "0" to a "1", state machine 19 obtains the present values of $\Delta i_L$ and $v_L$. State machine 19 then proceeds from state 27 to state 28. In state 28, state machine 19 causes motor 3 to run until a condition "Fault=0", which means that there is no error and therefore motor 3 is running perfectly, changes to "Fault=1". The condition "Fault=1" may mean that motor 3 is not running, or there is excessively high motor current, or an excessively low drive voltage, or some other unacceptable fault condition exists. Then state machine 19 returns to state 25.

FIG. 3B shows a diagram of a state machine 20 which can be included in BEMF reconstruction circuit 23 in FIG. 2 to generate the feedback and synchronization signal SYNC. State machine 20 includes states 50, 51, 52, 53, 54, and 55. "Start" state 50 is set when a condition "start" goes from a "0" to a "1", and this causes state machine 20 to go to state 51. In state 51, state machine 20 captures the digitized value of a present value of the motor phase current i when a condition "capCurrReady" goes from a "0" to a "1". (Note that phase current i already has been digitized by phase current sensing circuit 21 in FIG. 2.) State machine 20 then goes to state 52 and captures the digitized present value of motor drive voltage v when the condition "capVoltReady" goes from a "0" to a "1". State machine 20 then goes to state 53 and calculates the BEMF signal $v_{bemf}$ according to Equation 6, and then goes to state 54 if MSB is equal to "0" and sets SYNC to a "0" as indicated by state 54. If MSB is a "1", state machine 20 sets SYNC to a "1". (MSB is the most significant bit of the computed digitized signal $v_{bemf}$). In either case, state machine 20 goes to state 51 and again captures a new digitized present value of phase current i when "capCurrReady" goes from a "0" to a "1". What this means is that $v_{bemf}$ is compared with a provided reference value that represents the desired speed of motor 3. If $v_{bemf}$ is greater than the desired motor speed reference value, then SYNC is set to a "1", and if $v_{bemf}$ is less than the desired motor speed reference value, then SYNC is set to a "0".

Figure 4:
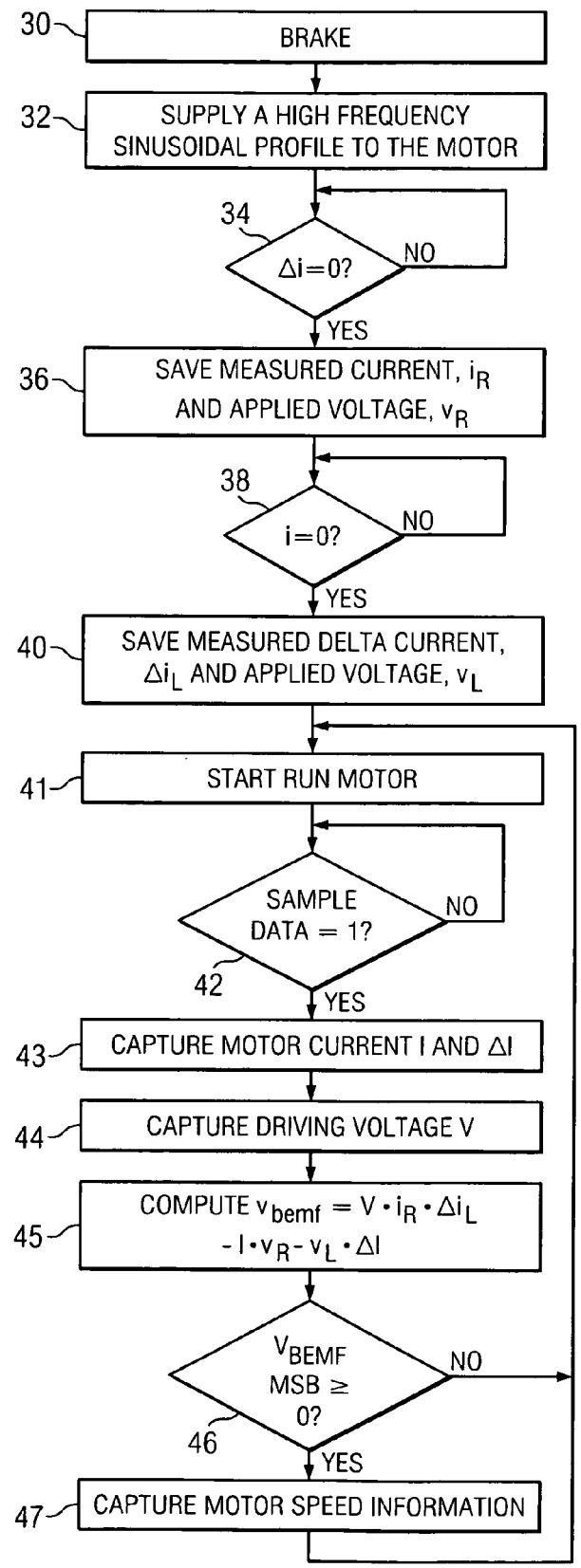
FIG. 4 is a flow diagram useful in describing the method associated with the circuit described with reference to FIG. 2 and the state machines shown in FIGS. 3A and 3B.

Blocks 30-40 of FIG. 4 constitute a flowchart of the basic process performed by state machine 19 of FIG. 3A in parameter calculation circuit 22 of FIG. 2 to determine information representative of the constant parameters $R_m$ and $L_m$ of motor 3. In block 30 of FIG. 4, the running motor 3 is forced into a stationary or standby mode 3 by applying a mechanical brake to stop the rotor of motor 3 to ensure that the BEMF signal $v_{bemf}$ of Equation 2 is zero. In order to measure $R_m$ and $L_m$, a high frequency sinusoidal drive voltage is applied to motor 3, as indicated in block 32. Since the rotor of motor 3 is forced to be stationary, the applied high frequency drive voltage v does not move the rotor of motor 3, thereby ensuring that $v_{bemf}$ remains equal to zero. The loop associated with decision block 34 of FIG. 4 then waits until the computed value of Δi is equal to zero. Then, as indicated in block 36, the value of the digitized "measured phase current" $i_R$ and the value of the digitized "applied drive voltage" $v_R$ needed to compute $R_m$ are saved. The motor resistance $R_m$ may be determined from the measured current $i_R$ and the "driven voltage" $v_R$ when the condition i=0 in block 38 is met.

State machine 19 of FIG. 3A remains in state 26 as long as the condition deltaIisZero="0" continues. This is when the steps of blocks 36 and 38 in the flowchart of FIG. 4 have been completed. An idle loop associated with decision block 38 waits for the computed value of phase current i to be equal to zero. Then the value of the "measured current change" $\Delta i_L$ and the current $i_L$ needed to compute $L_m$ are determined and saved, as indicated in block 40. When state 27 of state machine 19 is complete, that means the step in block 40 of FIG. 4 has been completed.

Blocks 41-47 of subsequently described FIG. 4 indicate how the foregoing information representative of the values of $R_m$ and $L_m$ is used by state machine 20 in FIG. 3B of BEMF reconstruction circuit 23 of FIG. 2, to provide the reconstructed BEMF data. In block 41 of FIG. 4, the running of motor 3 is started by the state machine of FIG. 3B. In decision block 42, the state machine determines whether a variable SAMPLE DATA is equal to "1". The data is sampled at a fixed frequency. Therefore, at the end of every fixed period Δt, SAMPLE DATA goes to "1" to sample the data. If the determination of decision block 42 is affirmative, state machine 20 goes to block 43 and captures the digitized present motor current and the rate of change (during an interval Δt) of the present motor current to obtain the digitized values I and ΔI. If the determination of decision block 42 is negative, state machine 20 waits until SAMPLE DATA is equal to a "1". In block 44, state machine 20 captures the motor drive voltage to obtain the digitized value V. Next, state machine 20 goes to block 45 and computes the digital value of $v_{bemf}$ in accordance with Equation 6. Then, state machine 20 goes to decision block 46 and determines if the MSB (most significant bit) of the digital value of $v_{bemf}$ is greater than or equal to 0, to cause SYNC to be generated. If the determination of decision block 46 is affirmative, the state machine goes to block 47 and captures the digital value of $v_{bemf}$ and returns to the entry point of block 41. If the determination of decision block 46 is negative, the program returns to the entry point of block 41.

The previously measured motor speed represented by the frequency of SYNC in FIG. 2 is used as the basis for the current voltage profile generation. If motor 3 is accelerating or decelerating (e.g., due to the varying load), the frequency of motor drive voltage profile generated by sine driving profile circuit 14 automatically changes to adapt to the speed change of the accelerating or decelerating motor and causes PWM generation circuit 15 to modify the amplitudes of the motor drive voltages accordingly. Therefore, there is no need for the previously mentioned complex PID control calculations which are required in the closest prior art motor controllers.

Thus, the BEMF of motor 3 as a function of time is calculated on the basis of Equations 1-6 and used to determine the present BEMF zero-crossing times and the present motor speeds without having to tri-state the motor drive voltages. In the above described example, motor 3 is driven with a pure sinusoidal pattern having a frequency equal to the frequency of the measured speed of motor 3 adjusted so as to be equal to the frequency of the desired motor speed in response to the signal SYNC shown in FIG. 5. This sinusoidal pattern is updated every AC cycle, and the zero-crossing points at which the calculated BEMF goes from negative to positive and vice versa are used for synchronization of the motor drive signal with the reconstructed BEMF signal.

Figure 1:
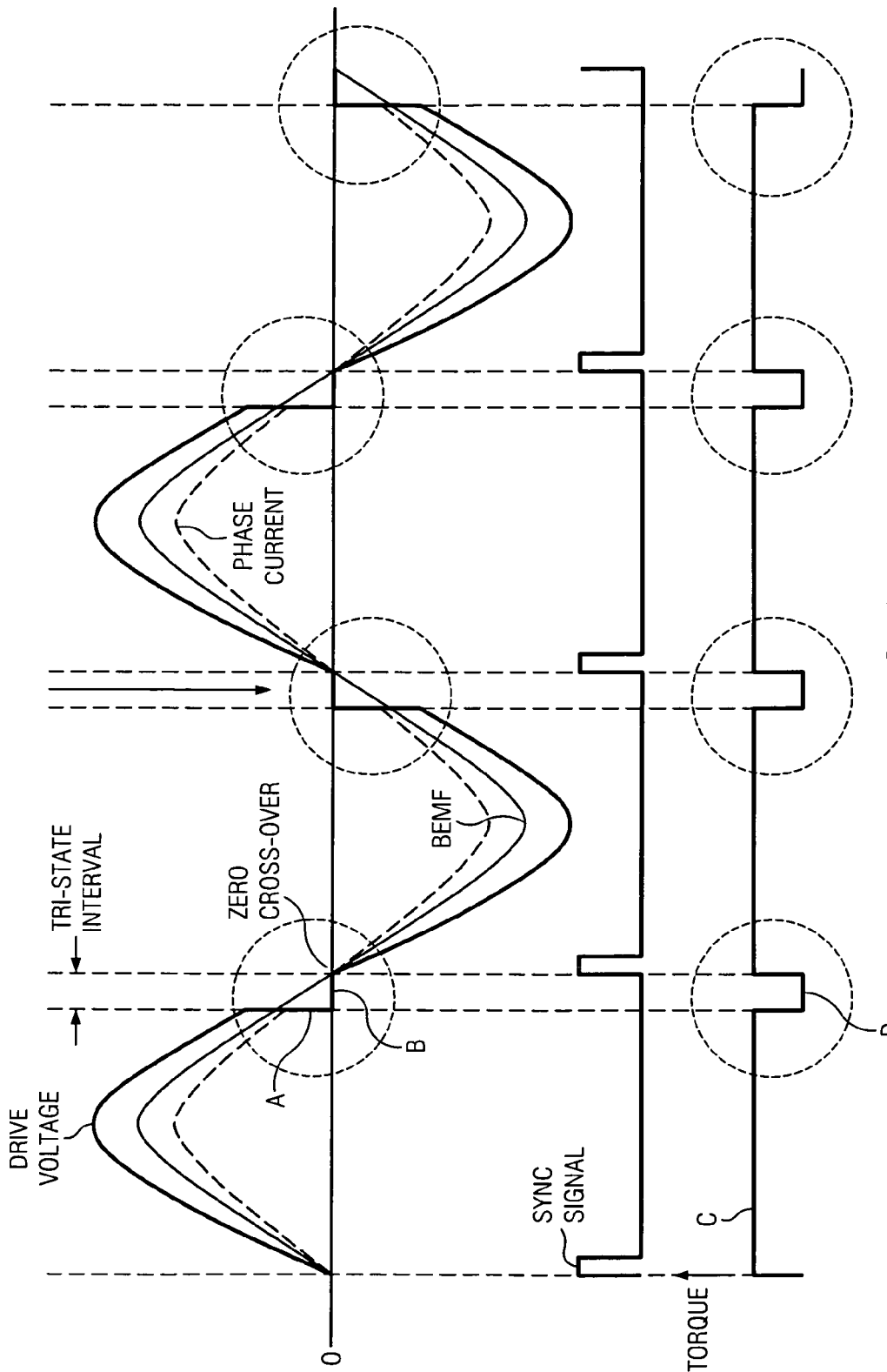
FIG. 1 is a timing diagram useful in explaining the shortcomings of the closest prior art.

FIG. 5 shows waveforms for the sinusoidal drive voltage v, the resulting phase current i, and the voltage represented by the reconstructed BEMF of permanent magnet motor 3 in FIG. 2. Note that segments "A" and "B" shown in Prior Art FIG. 1 are missing from the waveforms shown in FIG. 5 because no tri-stating of the motor drive voltages occurs in permanent magnet motor 3 in FIG. 2. Therefore, there is no corresponding distortion of the phase current waveform shown in FIG. 5. As previously mentioned, the torque of a permanent magnet motor is equal to the product of its BEMF (back electromotive force) and its phase current. As illustrated by the constant, ripple-free torque curve shown in FIG. 5, there is none of the large torque variation due to the phase current distortion seen in Prior Art FIG. 1. Consequently, essentially no acoustic noise is generated by motor 3.

To summarize, the phase current and the motor parameters in the foregoing example of the invention are provided as inputs to a state machine (or other suitable circuitry) to reconstruct the BEMF signal on a real-time basis, and to extract the zero-crossing information from the reconstructed BEMF signal to generate the synchronization signal SYNC. The drive voltages of the motor 3 are synchronized with the reconstructed BEMF data without tri-stating the motor drive voltages on conductors 9-1, 9-2, and 9-3, respectively. Distortion in the torque produced by motor 3 by the prior art technique of sensing the actual BEMF zero-crossings to achieve synchronization of the drive voltage and the BEMF of the motor phase current is essentially eliminated. Therefore, and in contrast to the closest prior art, there is no corresponding distortion in the phase current and consequently no acoustic noise.

Since the described control scheme makes use of the motor speed represented by the SYNC signal, the disclosed motor control system 1 of FIG. 2 eliminates the need for the previously mentioned complex calculations that are required in the closest prior art DC permanent magnet motor control systems. Furthermore, the information representative of the motor parameters $L_m$ and $R_m$ is automatically determined.

Furthermore, the above described technique works for both sinusoidal and trapezoidal BEMF motors.

Although a sinusoidal BEMF motor has been described, the method and equations are not limited to a sinusoidal BEMF motor. The same scheme/method may be used for a trapezoidal BEMF motor (although the improvement in acoustic performance may not be as great as for a sinusoidal BEMF motor). This is in contrast to methods that use a DSP (digital signal processor) and the previously mentioned Clarke-Park transformation, wherein the motors BEMF must be sinusoidal.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

It should be understood that the invention may be used to reduce acoustic noise in various motor applications, including cooling fans for consumer electronic devices, ceiling fans, cooling fans for home appliances, and the like. The invention is also applicable to brushless permanent magnet DC motors (i.e., motors having a trapezoidal BEMF).

What is claimed is:

1. A system for controlling a permanent magnet motor, comprising:
   (a) a driver circuit for generating a drive voltage applied to the motor, the motor generating a phase current in response to the drive voltage;
   (b) phase current sensing circuitry for sensing the phase current and converting it to a digitized phase current;
   (c) a BEMF (back electromotive force) reconstruction circuit for providing a reconstructed digital representation of a BEMF signal of the motor to generate an error-corrected synchronization signal in response to the digitized phase current signal, an amplitude feedback signal, information indicative of both a resistance and an inductance of the motor, and a detected error in a speed of the motor;
   (d) signal profile generating circuitry for generating a motor drive signal having an error-corrected frequency that is determined by the synchronization signal and is in synchronization with the synchronization signal; and
   (e) a PWM (pulse width modulation) circuit receiving the motor drive signal for producing a PWM signal having a frequency equal to the error-corrected frequency of the synchronization signal and having a duty cycle controlled in accordance with the detected error in the speed of the motor,
   a parameter calculation circuit for generating the information indicative of both the motor resistance and the motor inductance in response to the digitized phase current under predetermined conditions,
   wherein the parameter calculation circuit includes a state machine which performs the functions of mechanically stopping rotation of a rotor of the motor, applying the drive voltage as a high frequency sinusoidal signal until the phase current is at a DC value, saving a first value of the applied voltage, and saving a resulting value of the digitized phase current, generating the information indicative of the motor resistance from the first value of the applied voltage and the resulting value of the digitized phase current signal, causing the phase current to be equal to zero, saving a measured value of current change and a second value of the applied drive voltage, and generating the information indicative of the motor inductance from the measured value of current change and the second value of the applied drive voltage.

2. The system of claim 1 wherein the motor resistance is represented by the expression $R_m = v_R/i_R$ and wherein the motor inductance is represented by the expression $$L_m = \frac{v_L}{\Delta i_L / \Delta t},$$

where $v_R$ is the first value of the applied voltage, $i_R$ is the resulting value of the digitized phase current, $v_L$ is the second value of the applied drive voltage, $\Delta i_L$ is the measured value of current change, and $\Delta t$ is a time interval.

3. The system of claim 1 wherein the BEMF reconstruction circuit includes a state machine which operates to capture a digitized phase current, a change in the digitized phase current, and a digitized motor driving voltage.

4. The system of claim 3 wherein the BEMF construction circuit operates to compute a value of the BEMF signal in accordance with the expression $$k \cdot v_{bemf} = V \cdot i_R \cdot \Delta i_L - I \cdot v_R - v_L \cdot \Delta I,$$

where V is the digitized motor driving voltage, I is the digitized phase current, $\Delta I$ is a change in the digitized phase current, $i_R$ is a current indicative of the resistance of the motor, $v_R$ is a voltage indicative of the resistance, $\Delta i_L$ is a change of a current indicative of the inductance of the motor, and $v_L$ is a voltage indicative of the inductance of the motor,
and wherein k is $i_R \times \Delta i_L$.

5. The system of claim 4 wherein the state machine operates to cause the synchronization signal to be at a first logic level if a MSB (most significant bit) of the BEMF signal is a "0" and to cause the synchronization signal to be at a second logic level if the MSB of the BEMF signal is a "1".

6. The system of claim 5 including another state machine for generating the information indicative of the resistance and the inductance of the motor in response to the phase current.

7. The system of claim 1 wherein the signal profile generating circuitry includes an electrical period measuring circuit for measuring an amount of time between corresponding edges of successive pulses of the synchronization signal.

8. The system of claim 1 wherein the phase current sensing circuit includes an external current sensor for sensing the phase current.

9. The system of claim 1 wherein the motor is a three phase motor, and the phase current is generated in response to a single drive voltage.

10. The system of claim 1 wherein the signal profile generating circuit generates the motor drive signal as a sinusoidal signal.

11. The system of claim 1 wherein the signal profile generating circuit generates the motor drive signal as a trapezoidal signal.

12. A method for controlling a permanent magnet motor, comprising:
   (a) generating a drive voltage applied to the motor, the motor generating a phase current in response to the drive voltage;
   (b) sensing the phase current and converting it to a digitized phase current signal;
   (c) providing information indicative of both a motor resistance and a motor inductance;

(d) generating a reconstructed digital representation of a BEMF signal produced in the motor in response to an amplitude feedback signal, the digitized phase current signal, the information indicative of the motor resistance and the motor inductance, and a detected difference between a speed of the motor and a desired speed of the motor in order to produce a synchronization signal having an error-corrected frequency that is determined by zero crossover points of the reconstructed digital representation of the BEMF signal;

(e) using a drive signal profile to generate a digital motor drive signal having the error-corrected frequency; and (f) producing a PWM signal having a frequency equal to the error-corrected frequency and also having a duty cycle controlled according to the detected difference between the speed of the motor and the desired speed of the motor, and operating the BEMF reconstruction circuit to compute a value of the BEMF signal in accordance with the expression:

$$k \cdot v_{bemf} = V \cdot i_R \cdot \Delta i_L - I \cdot v_R - v_L \cdot \Delta I,$$

where V is the digitized motor driving voltage, I is the digitized phase current, $\Delta I$ is a change in the digitized phase current, $i_R$ is a current indicative of the resistance of the motor, $v_R$ is a voltage indicative of the resistance, $\Delta i_L$ is a change of a current indicative of the inductance of the motor, and $v_L$ is a voltage indicative of the inductance of the motor, and k is equal to $i_R \times \Delta i_L$.

13. The method of claim 12 including operating the state machine to cause the synchronization signal to be at a first logic level if a MSB (most significant bit) of the BEMF signal is a "0" and to cause the synchronization signal to be at a second logic level if the MSB of the BEMF signal is a "1".

14. The method of claim 12 including operating the signal profile generating circuit to generate the motor drive signal as a sinusoidal signal.

15. The method of claim 12 wherein the BEMF reconstruction circuit includes a state machine which operates to capture the digitized phase current, the change in the digitized phase current, and the digitized motor driving voltage, the method including operating the state machine to cause the synchronization signal to be at a first logic level if a MSB (most significant bit) of the BEMF signal is a "0" and to cause the synchronization signal to be at a second logic level if the MSB of the BEMF signal is a "1".

16. A system for controlling a permanent magnet motor, comprising:

(a) means for generating a drive voltage applied to the motor, the motor generating a phase current in response to the drive voltage;

(b) means for sensing the phase current and converting it to a digitized phase current signal;

(c) means for providing information indicative of both a motor resistance and a motor inductance;

(d) means for generating a reconstructed digital representation of a BEMF signal produced in the motor in response to an amplitude feedback signal, the digitized phase current signal, the information indicative of the motor resistance and the motor inductance, and a detected difference between a speed of the motor and a desired speed of the motor in order to produce a synchronization signal having an error-corrected frequency that is determined by zero cross-over points of the reconstructed digital representation of the BEMF signal;

(e) means for using a drive signal profile to generate a digital motor drive signal having the error-corrected frequency; and (f) means for producing a PWM signal having a frequency equal to the error-corrected frequency and also having a duty cycle controlled according to the detected difference between the speed of the motor and the desired speed of the motor, (g) means for parameter calculation for generating the information indicative of both the motor resistance and the motor inductance in response to the digitized phase current under predetermined conditions, wherein the means for calculating includes a state machine which performs the functions of mechanically stopping rotation of a rotor of the motor, applying the drive voltage as a high frequency sinusoidal signal until the phase current is at a DC value, saving a first value of the applied voltage, and saving a resulting value of the digitized phase current, generating the information indicative of the motor resistance from the first value of the applied voltage and the resulting value of the digitized phase current signal, causing the phase current to be equal to zero, saving a measured value of current change and a second value of the applied drive voltage, and generating the information indicative of the motor inductance from the measured value of current change and the second value of the applied drive voltage.

17. The system of claim 16 wherein means for generating a reconstructed digital representation of a BEMF signal includes a state machine which operates to capture a digitized phase current, a change in the digitized phase current, and a digitized motor driving voltage, wherein the means for generating a reconstructed digital representation of a BEMF signal operates to compute a value of the BEMF signal in accordance with the expression $$k \cdot v_{bemf} = V \cdot i_R \cdot \Delta i_L - I \cdot v_R - V_L \cdot \Delta I,$$

where V is the digitized motor driving voltage, I is the digitized phase current, $\Delta I$ is a change in the digitized phase current, $i_R$ is a current indicative of the resistance of the motor, $v_R$ is a voltage indicative of the resistance, $\Delta i_L$ is a change of a current indicative of the inductance of the motor, and $v_L$ is a voltage indicative of the inductance of the motor, and k is equal to $i_R \times \Delta i_L$.

18. The system of claim 17 wherein the state machine operates to cause the synchronization signal to be at a first logic level if a MSB (most significant bit) of the BEMF signal is a "0" and to cause the synchronization signal to be at a second logic level if the MSB of the BEMF signal is a "1".

19. The system of claim 18 including another state machine for generating the information indicative of the resistance and the inductance of the motor in response to the phase current.

20. The system of claim 16 wherein the means for generating a signal profile includes an electrical period measuring circuit for measuring an amount of time between corresponding edges of successive pulses of the synchronization signal.

* * * * *